(12) United States Patent
Zhao et al.

(10) Patent No.: US 10,391,900 B2
(45) Date of Patent: Aug. 27, 2019

(54) VENTILATED VEHICLE SEAT

(71) Applicant: Faurecia Automotive Seating, LLC, Auburn Hills, MI (US)

(72) Inventors: Ying (Carolyn) Zhao, Auburn Hills, MI (US); Robert C. Fitzpatrick, Holland, MI (US); Cedric Ketels, Holland, MI (US); John M. Perraut, Rochester Hill, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 14 days.

(21) Appl. No.: 15/850,563

(22) Filed: Dec. 21, 2017

(65) Prior Publication Data
US 2018/0178692 A1 Jun. 28, 2018

Related U.S. Application Data

(60) Provisional application No. 62/439,546, filed on Dec. 28, 2016.

(51) Int. Cl.
*B60N 2/56* (2006.01)
*B60N 2/58* (2006.01)
*B60H 1/00* (2006.01)

(52) U.S. Cl.
CPC ......... *B60N 2/5657* (2013.01); *B60N 2/5628* (2013.01); *B60N 2/58* (2013.01); *B60H 1/00828* (2013.01)

(58) Field of Classification Search
CPC ...... B60N 2/56; B60N 2/5621; B60N 2/5642; B60N 2/5657; B60N 2/5628; B60N 2/58; B60H 1/00828
See application file for complete search history.

(56) References Cited

U.S. PATENT DOCUMENTS

2016/0079729 A1* 3/2016 Huang ................. H05K 1/0209
372/36
2016/0341697 A1* 11/2016 Lal .......................... G01N 27/64
2017/0354190 A1* 12/2017 Cauchy .................. A47C 7/744

FOREIGN PATENT DOCUMENTS

WO WO2016/077843 * 5/2016

* cited by examiner

*Primary Examiner* — Philip F Gabler
(74) *Attorney, Agent, or Firm* — Barnes & Thornburg LLP

(57) ABSTRACT

An occupant support adapted for use in a vehicle includes a cushion, an air-permeable cushion cover, and a ventilation unit. The cushion is adapted to support an occupant on the occupant support. The air-permeable cushion cover is arranged around at least a portion the cushion. The ventilation unit is configured to selectively cool the occupant of the occupant support with convective cooling through the air-permeable cushion cover.

19 Claims, 4 Drawing Sheets

VENTILATED VEHICLE SEAT

PRIORITY CLAIM

This application claims priority under 35 U.S.C. § 119(e) to U.S. Provisional Application Ser. No. 62/439,546 filed Dec. 28, 2016, which is expressly incorporated by reference herein.

BACKGROUND

The present disclosure relates to occupant supports, and particularly to occupant supports configured to provide air flow between the occupant support and an occupant of the occupant support. More particularly, the present disclosure relates to occupant supports configured to cool the occupant of the occupant support.

SUMMARY

According to the present disclosure, a vehicle includes an occupant support mounted to a floor of the vehicle. The occupant support includes a seat bottom coupled to the floor of the vehicle for movement therewith and a seat back that extends upwardly away from the seat bottom. Each of the seat bottom and the seat back include a cushion and a cushion cover. The cushion is adapted to support an occupant of the occupant support. The cushion cover is arranged around at least a portion of the cushion.

In illustrative embodiments, the cushion cover is an air-permeable cushion cover and the occupant support further includes a ventilation unit configured to cool selectively the occupant with convective cooling through the air-permeable cushion cover. The ventilation unit includes a plurality of piezoelectric fans located in the cushion and a flexible support panel coupled to the piezoelectric fans. The ventilation unit is configured to enter a cooling mode in which the piezoelectric fans produce a flow of air. The ventilation unit may be located near the air-permeable cushion cover because of the size of the piezoelectric fans and the flexible material of the fans and the support panel. As a result, the ventilation unit may provide faster cooling to the occupant and may provide more efficient cooling.

In illustrative embodiments, the cushion includes an outer surface, an inner surface, and an intermediate surface. The outer surface is arranged to face the occupant. The inner surface is spaced apart from the outer surface. The intermediate surface is located between the outer surface and the inner surface. The ventilation unit is located between the intermediate surface and the inner surface of the cushion to locate the ventilation unit near the cushion cover and away from the inner surface.

In illustrative embodiments, the air-permeable cushion cover and the cushion cooperate to define a plurality of ridges that extend toward the occupant and away from the inner surface. A pair of neighboring ridges cooperate to form a channel therebetween. The plurality of piezoelectric fans are aligned with the channel so that the flow of air is conducted into the channel and around the occupant during operation of the ventilation unit.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
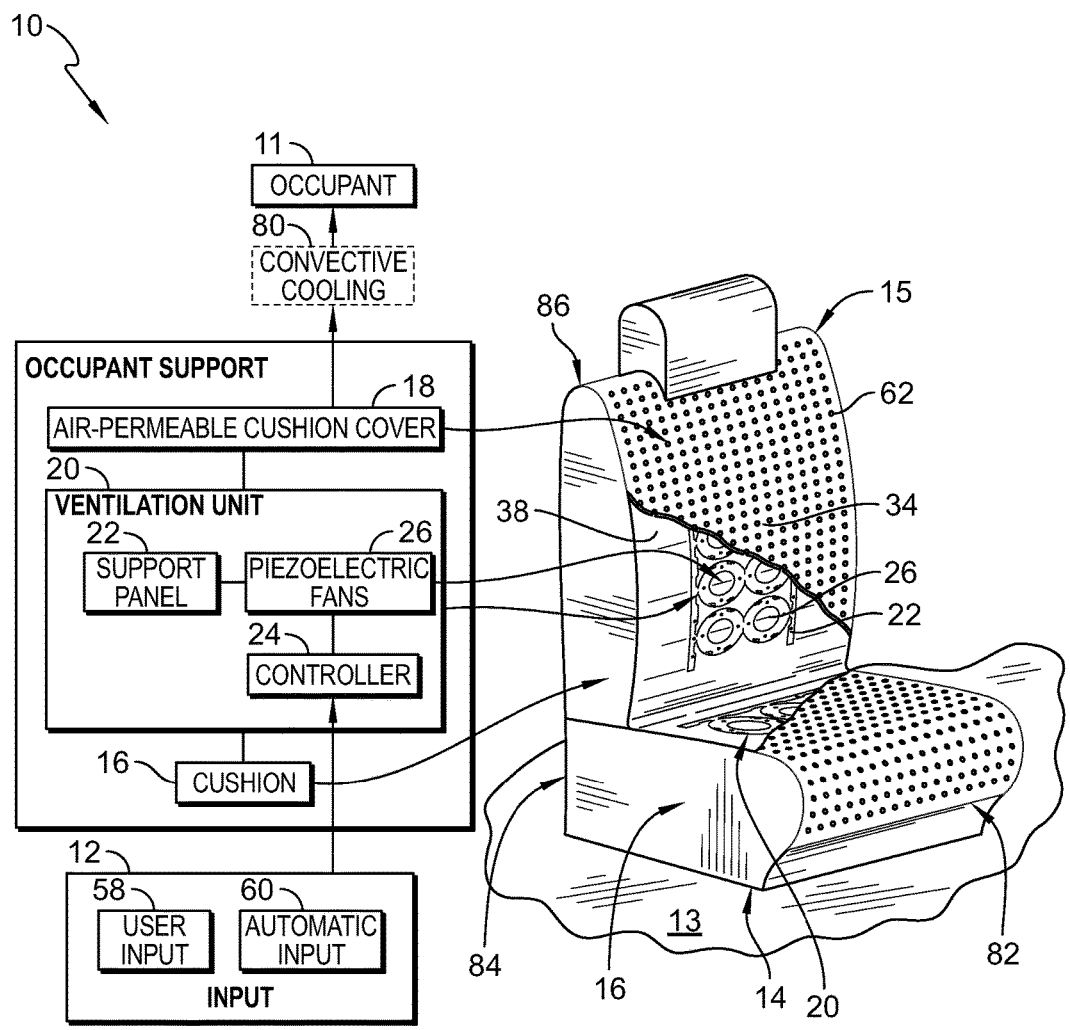
FIG. 1 is a perspective and diagrammatic view of an occupant support adapted for use in a passenger vehicle showing that the occupant support includes a seat bottom mounted to a floor of the vehicle and a seat back that extends upwardly away from the seat bottom, the seat bottom and seat back including cushions, an air-permeable cushion cover arranged around the cushions, and ventilation units, and further showing that each ventilation unit includes a plurality of piezoelectric fans coupled to a support panel and located in a cushion to apply a cold sensation to an occupant of the occupant support using convective cooling through the air-permeable cushion cover.

An occupant support 10 in accordance with the present disclosure is shown in FIGS. 1-4. Occupant support 10 includes a cushion 16, an air-permeable cushion cover 18 arranged around cushion 16, and a ventilation unit 20 located between cushion 16 and air-permeable cushion cover 18. Ventilation unit 20 is configured to provide convective cooling selectively to cool occupant 11 through air-permeable cushion cover 18 in response to an input 12.

Ventilation unit 20 includes flexible a support panel 22 and piezoelectric fans 26 as shown in FIGS. 1-4. Each piezoelectric fan 26 is located in cushion 16 and generates a cold sensation 80 selectively in response to input 12. Piezoelectric fans 26 are coupled to flexible support panel 22 and extend between air-permeable cushion cover 18 and cushion 16 to disperse air flow 32 generated by the piezoelectric fan 26 to occupant 11.

Occupant support 10 includes a seat bottom 14 and a seat back 15 as shown in FIG. 1. Seat bottom 14 is coupled to floor 13 to support occupant 11 in the vehicle. Seat back 15 is coupled to seat bottom 14 and extends upward and away from seat bottom 14. Seat back 15 is configured to pivot relative to seat bottom 14 between an upright position and a folded forward position. Each of seat bottom 14 and seat back 15 include cushion 16, air-permeable cushion cover 18, and ventilation units 20.

Occupant support 10 further includes a controller 24 as shown in FIG. 1. Each piezoelectric fan 26 is connected to controller 24, and controller 24 is configured to control the transmission and flow direction of electric energy to piezoelectric fans 26. Controller 24 is configured to transmit commands to piezoelectric fans 26 in response to one or more inputs 12. Inputs 12 may be user inputs 58 or automatic inputs 60. Manual input is adjusted and controlled by occupant 11.

In automatic mode 60, occupant support 10 determines occupant's 11 body temperature by the use of sensors placed under air-permeable cushion cover 18 and regulates ventilation unit 20 temperature by providing a cold sensation 80 to maximize thermal comfort. Automatic mode 60 may also be associated with an intelligent system integrated into a vehicle. The intelligent system may be included in an autonomous or semi-autonomous vehicle to provide thermal therapies. The therapies may include cold sensation 80 to maximize comfort, provide related sensations, mitigate fatigue, and avoid drowsiness, and other similar conditions.

Controller 24 may provide various thermal comfort options for occupant 11. For example, ventilation unit 20 in seat bottom 14 may be in the cooling mode while ventilation unit 20 in seat back 15 may be inactive. In another example, ventilation unit 20 in seat bottom 14 may be inactive while ventilation unit 20 in seat back 15 may be in cooling mode.

Cushion 16 is configured to support occupant 11 and is deformable to an extent to adjust to a contour of occupant 11 as suggested in FIG. 1. Cushion 16 comprises foam material as suggested in FIGS. 2 and 4. In other embodiments, cushion 16 comprises gel material. In some embodiments, the cushion 16 comprises a mesh of conductive material such as, for example, a copper mesh. Cushion 16 includes outer surface 34, intermediate surface 38, inner surface 36, and spacer surface 44 as shown in FIG. 4.

Figure 4:
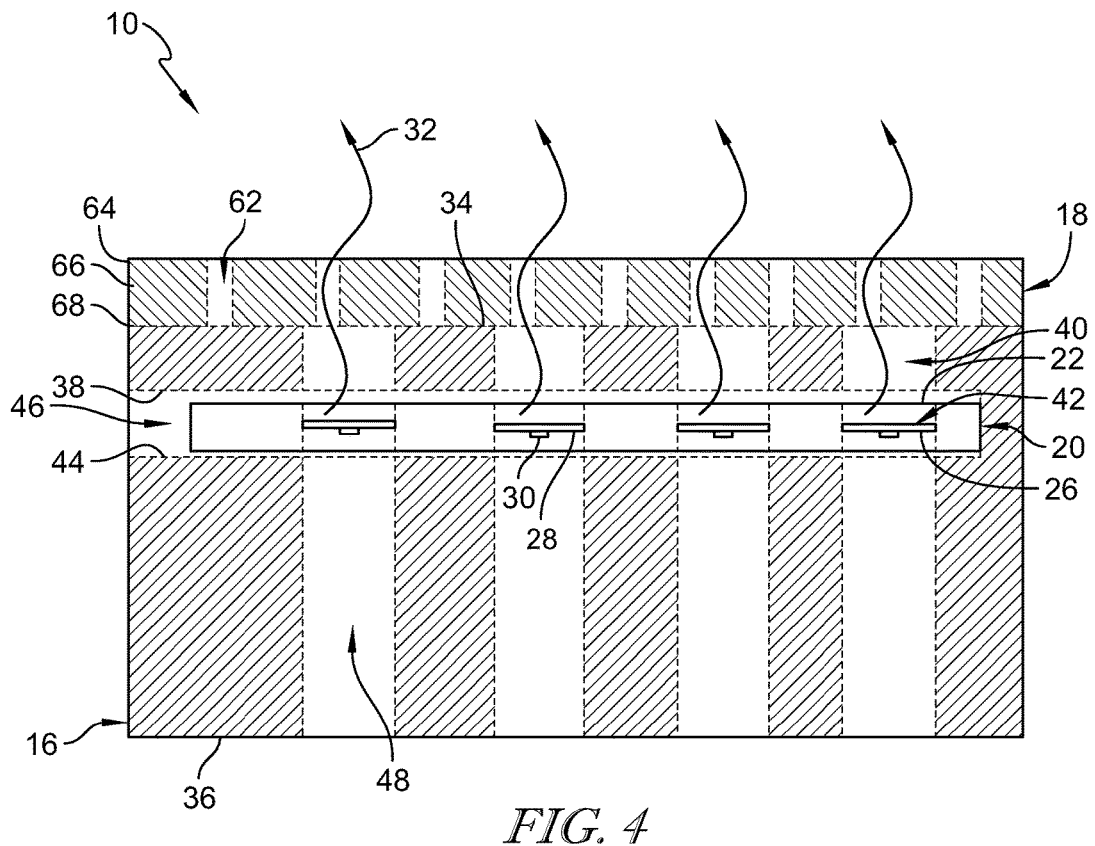
FIG. 4 is a sectional view of the occupant support of FIG. 1 showing the cushion, the air-permeable cushion cover, and the ventilation unit located in the cushion, and the piezoelectric fans are located in cooling passages defined by the cushion and within the air-permeable cushion cover.

Cushion 16 is formed to include cooling passages 40, as shown in FIG. 4. Outer surface 34 is arranged to face occupant 11, and air-permeable cushion cover 18 is arranged around outer surface 34. Cooling passage 40 extends between outer surface 34 and intermediate surface 38 of cushion 16 and is configured to direct air flow 32 produced by ventilation unit 20 towards occupant 11 through air-permeable cushion cover 18.

Intermediate surface 38 of cushion 16 is configured to face ventilation unit 20. Ventilation unit 20 includes flexible support panel 22 and piezoelectric fan 26 coupled to flexible support panel 22. Flexible support panel 22 is formed to include panel aperture 42 that extends through flexible support panel 22 and piezoelectric fan 26 closes panel aperture 42. Illustratively, panel aperture 42 is circular shaped, and a deformable membrane 28 of the piezoelectric fan 26 is circular shaped as suggested in FIGS. 2 and 4.

Inner surface 36 of cushion 16 is spaced apart from outer surface 34 of cushion 16. Intake passage 48, as defined by cushion 16, extends between inner surface 36 and spacer surface 44. Intake passage 48 is configured to provide ambient air to piezoelectric fan 26 to allow piezoelectric fan 26 to produce air flow 32 that is directed towards occupant 11 through cooling passage 40 and air-permeable cushion cover 18. Piezoelectric fan 26 is aligned with intake passage 48 to maximize air flow 32.

Spacer surface 44 of the cushion 16 is located between intermediate surface 38 and inner surface 36 of the cushion 16. Spacer surface 44 is spaced apart from intermediate surface 38 to define slot 46. Slot 46 is configured to receive ventilation unit 20.

Air-permeable cushion cover 18 extends along outer surface 34 of cushion 16 as shown in FIG. 1. Air-permeable cushion cover 18 is formed to include air flow apertures 62 that extend through air-permeable cushion cover 18 to allow air flow 32 to reach occupant 11.

Air-permeable cushion cover 18 includes an outer layer 64, an intermediate layer 66, and an inner layer 68 as shown in FIG. 4. Outer layer 64 comprises upholstery materials such as, for example, leather, cloth, microfiber, polymeric materials, and any other suitable material. Intermediate layer 66 is located between outer layer 64 and inner layer 68 and supports outer layer 64. Inner layer 68 is located between intermediate layer 66 and cooling passage 40. In some embodiments, air-permeable cushion cover 18 includes only one layer. In other embodiments, air-permeable cushion cover 18 includes any number of layers. In the illustrative embodiment, outer layer 64 comprises leather. Outer layer 64 is perforated to allow air flow 32 to vent through air-permeable cushion cover 18 via air flow aperture 32.

Illustratively, a first ventilation unit 20 is incorporated into seat bottom 14 as shown in FIG. 1, and a second ventilation unit 20 is incorporated into seat back 15. In other embodiments, more than one ventilation unit 20 is incorporated into seat bottom 14, and more than one ventilation unit is incorporated into seat back 15. In other embodiments, one or more ventilation units 20 are included in only one of seat bottom 14 or seat back 15. In some embodiments, seat bottom 14 and seat back 15 include a different number and/or a different arrangement of ventilation units 20.

Ventilation unit 20 provides occupant 11 with a cold sensation 80 when ventilation unit 20 is in the cooling mode. Ventilation unit 20 provides means for directing air flow 32 produced by piezoelectric fans 26 to occupant 11 via convective cooling. Ventilation unit 20 includes flexible support panel 22 and piezoelectric fans 26.

Flexible support panel 22 includes panel apertures 42 that extend through flexible support panel 22 as shown in FIG. 4. Piezoelectric fans 26 close panel apertures 42. Panel apertures 42 are configured to receive piezoelectric fan 26. Illustratively, panel apertures 42 are circular shaped.

Each piezoelectric fan 26 includes deformable membrane 28 and piezoelectric motor 30 coupled to flexible support panel 22 as shown in FIG. 4. Piezoelectric motor 30 undulates deformable membrane 28 in response to input 12. Deformable membrane 28 disperses air generated by piezoelectric motor 30 to occupant 11. Illustratively, deformable membrane 28 is circular shaped. Piezoelectric motor 30 is configured to produce movement in response to receiving electric energy.

Piezoelectric fan 26 is configured to cool seat bottom 14 and/or seat back 15 in response to receiving electric energy. Piezoelectric fan 26 is connected to controller 24, and controller 24 is configured to control the transmission and flow direction of electric energy to piezoelectric fan 26. Upon input 12, either user input 58 or automatic input 60, controller 24 activates piezoelectric fans 26 of ventilation unit 20.

Controller 24 is in communication with piezoelectric motors 30. Piezoelectric motors 30 are coupled to flexible support panel 22 and deformable membrane 28. Piezoelectric motors 30 undulate deformable membranes 28 in response to input 12. Deformable membranes 28 disperse air flow 32 generated by piezoelectric motors 30 in intake passages 48 through cooling passages 40 directed towards occupant 11. Air flow 32 disperses from cooling passage 40 at the end nearest air-permeable cushion cover 18, and air flow 32 flows from air flow aperture 62 in air-permeable cushion cover 18.

Figure 2:
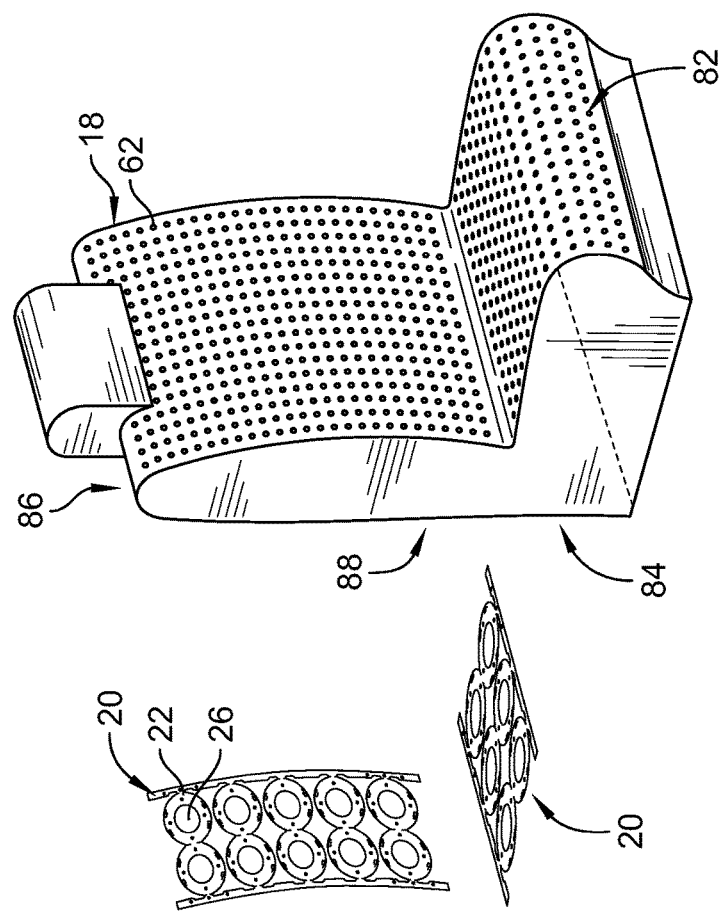
FIG. 2 is an exploded assembly view of the occupant support showing that the occupant support includes, from left to right, the cushions, the ventilation units including the plurality of piezoelectric fans coupled to the support panel, and the air-permeable cushion cover.
Figure 2:
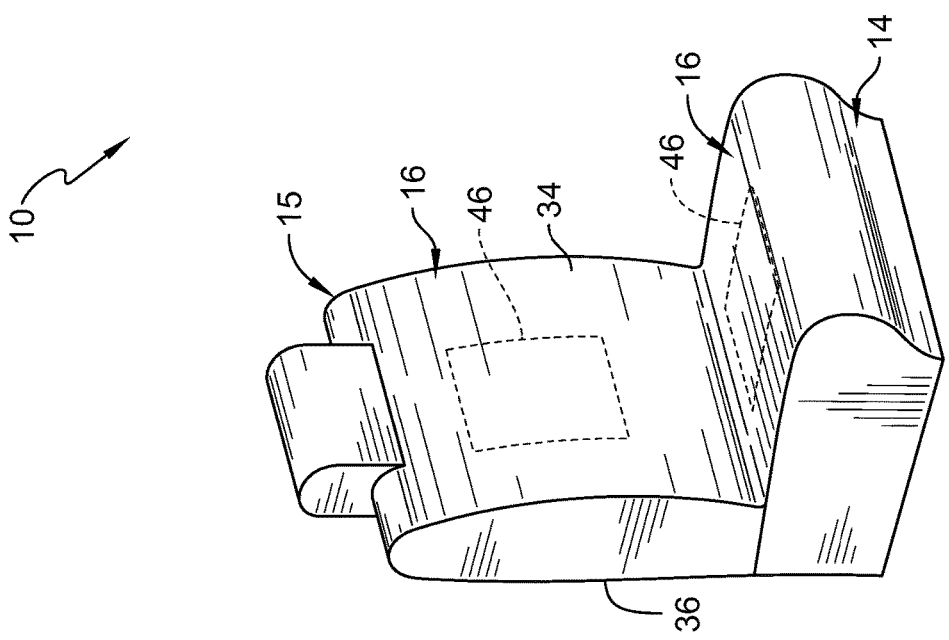
Figure 3:
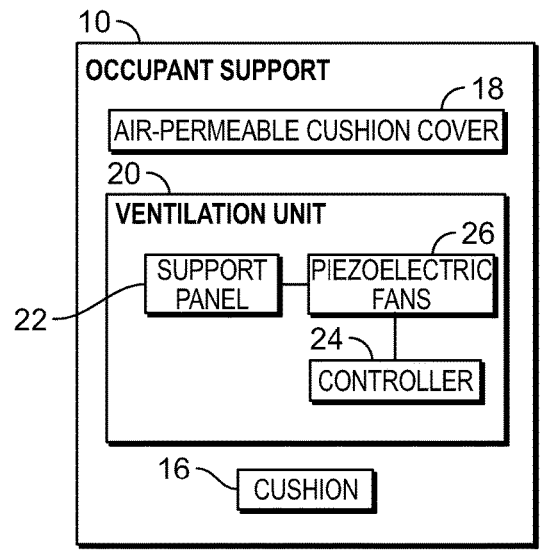
FIG. 3 is a diagrammatic view of the occupant support showing that the occupant support includes the cushion, the ventilation unit, and the air-permeable cushion cover and further showing that the ventilation unit includes the flexible support panel, the piezoelectric fans coupled to the flexible support panel, and the controller in communication with the piezoelectric fans.

FIG. 2 shows an arrangement of ventilation unit 20 in seat back 15 and ventilation unit 20 in seat bottom 14. Ventilation units 20 are spaced apart vertically as shown in FIG. 2. Ventilation unit 20 in seat bottom 14 extends between front 82 and back 84 of seat bottom 14. Ventilation unit 20 in seat back 15 extends between top 86 and bottom 88 of seat back 15. Ventilation units 20 are located within the cushion 16 between the outer surface 34 and the inner surface 36 of cushion 16 at the intermediate surface 38 of the cushion 16.

Figure 5:
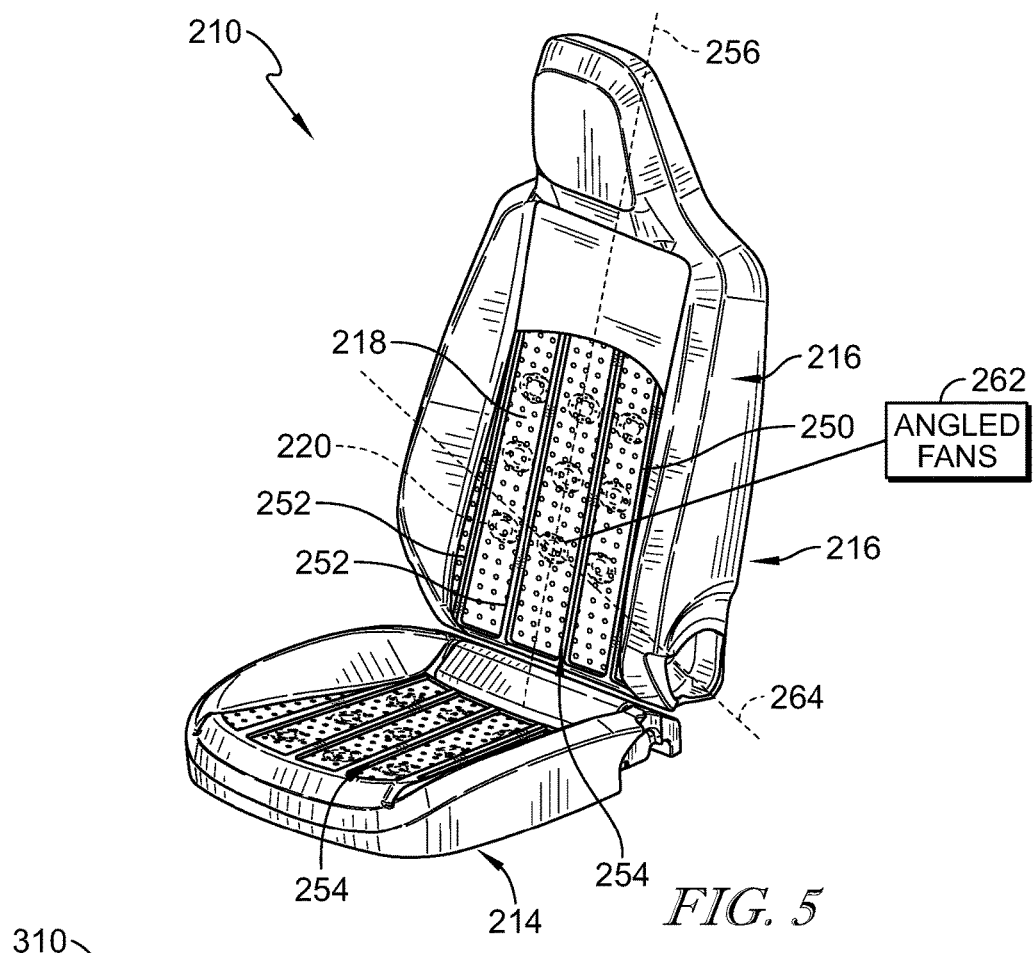
FIG. 5 is another embodiment of the occupant support in accordance with the present disclosure showing that the air-permeable cushion cover and the cushions cooperate to define a plurality of ridges which form channels and the piezoelectric fans are aligned with the channels defined by the plurality of ridges.

Another embodiment of an occupant support 210 is shown in FIG. 5. Occupant support 210 is substantially similar to occupant support 10 shown in FIGS. 1-4 and described herein. Accordingly, similar reference numbers in the 200 series indicate features that are common between occupant support 10 and occupant support 210. The description of occupant support 10 is incorporated by reference to apply to the occupant support 210, except in instances when it conflicts with the specific description and the drawings of the occupant support 210.

Air-permeable cushion cover 218 and cushion 216 of seat back 215 and seat bottom 214 cooperate to define a plurality of ridges 250 that extend towards occupant 11 and away from inner surface 236 of cushion 216 as shown in FIG. 5. A pair of neighboring ridges 252 cooperate to form channel 254 between the pair of ridges 252. Cooling passage 240 opens into channel 254 so that air flow is conducted into channel 254 during operation of ventilation unit 220. Ventilation unit 220 in seat bottom 214 extends between front 282 and back 284 of seat bottom 214. Ventilation unit 220 in seat back 215 extends between top 286 and bottom 288 of seat back 215.

Controller 224 activates piezoelectric fan 226 of ventilation unit 220 in response to input 212, either user input 58 or automatic input 60. Controller 224 is in communication with piezoelectric motors 230. Piezoelectric motors 230 are coupled to flexible support panel 222 and deformable membranes 228. Piezoelectric motors 230 undulate deformable membranes 228 in response to input 212. Each deformable membrane 228 disperses air flow generated by piezoelectric motor 230 through cooling passage 240. Cooling passage 240 opens into channel 254 so that air flow is conducted into channel 254 during operation of ventilation unit 220. Channel 254 is configured to direct air flow produced by piezoelectric fan 226 through air flow apertures 262 in air-permeable cushion cover 18 in a direction towards occupant 11.

Channel 254 extends along channel axis 256 and cooling passage 240 extends along passage axis 264. Passage axis 264 extends along channel axis 256 to define an angle between passage axis 264 and channel axis 256. Illustratively, the angle is greater than about zero degrees and less than about ninety degrees. Piezoelectric fan 226 is orientated to conduct air flow along passage axis 264.

Figure 6:
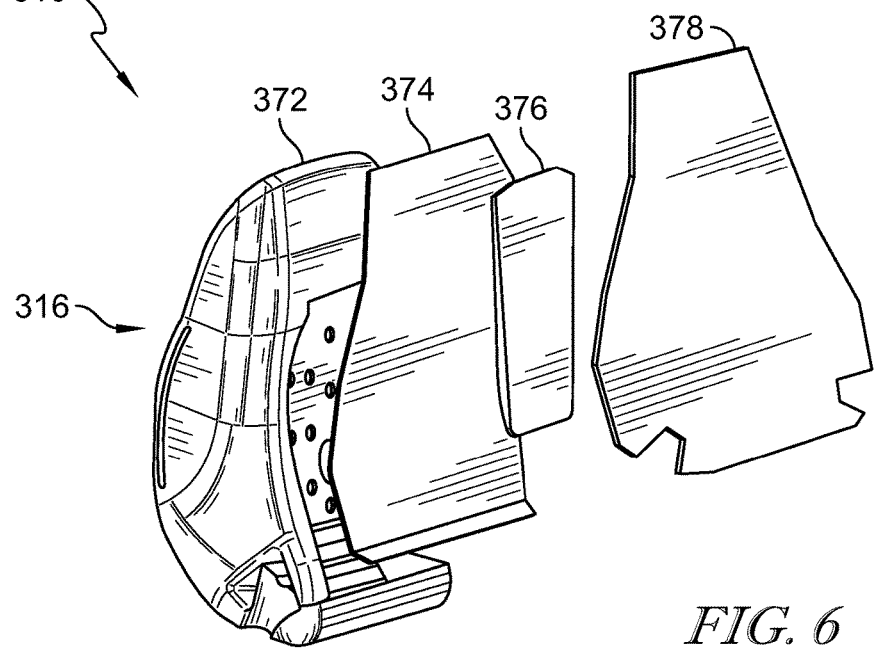
FIG. 6 is an exploded assembly view of the occupant support seat back showing that the occupant support seat back includes, from left to right, a foam layer, a film layer, a mesh layer, and a sealing fleece layer.

Another embodiment of an occupant support 310 is shown in FIG. 6. Occupant support 310 is substantially similar to occupant support 10 shown in FIGS. 1-4 and described herein. Accordingly, similar reference numbers in the 300 series indicate features that are common between occupant support 10 and occupant support 310. The description of occupant support 10 is incorporated by reference to apply to the occupant support 310, except in instances when it conflicts with the specific description and the drawings of the occupant support 310.

Cushions 316 of seat back 315 and seat bottom 314 comprise foam layer 372, film layer 374, mesh layer 376, and sealing fleece layer 378, as shown in FIG. 6. Foam layer 372, film layer 374, mesh layer 376, and sealing fleece layer 378 cooperate to form cushion 316 with cooling passage 440. Foam layer 472 is located nearest occupant 11 and is made of ventilated foam material using bi-density foam. In other embodiments, the foam is a single density rather than bi-density. Film layer 474 is located between foam layer 472 and mesh layer 476. Film layer 474 may disintegrate over time leaving cooling passage 440 of cushion 416. Mesh layer 476 is located between film layer 474 and sealing fleece layer 478 and is used to maintain the integrity of cooling passage 440. Sealing fleece layer 478 is located furthermost occupant 11. Sealing fleece layer 478 may not be thermoformed.

According to the present disclosure, a vehicle seat 10 includes seat bottom 14 and seat back 15 as shown in FIG. 1. Seat bottom 14 is coupled to floor 13 of a vehicle to move relative to floor 13. Seat back 15 is coupled to seat bottom 14 to move relative to seat bottom 14.

In illustrative embodiments, an occupant support includes the vehicle seat and a series of fans 26 coupled to vehicle seat to maximize ventilation efficiency so that comfort of occupant 11 sitting on the vehicle seat is maximized. Fans 26 may be small fans that enable piezo, electroactive polymer (EAP), and/or electromagnetic functionality.

In illustrative embodiments, the series of small fans 26 are mounted on a foam cushion 16 included in vehicle seat 10. Each small fan 26 may be located in an associated cavity formed in the foam cushion 16. Each small fan 26 is arranged to lie adjacent to a trim cover 18 arranged to extend around foam cushion 16.

In illustrative embodiments, the foam may be bi-density or other foam. The foam may include one or more pads by using plastic film. The cushion 16 may include a three-dimensional mesh, or other air flow distribution guide, the mesh or guide at the air channels, with a plastic film on the outer side in relation to the foam within the vehicle seat.

In illustrative embodiments, a sealing fleece on the foam may be located behind the rear side of the three-dimensional mesh, or other air flow distribution guide, at the air channels. During injection of the foam with different densities on each side of the plastic film, the plastic film may disappear and the two or more density foams may be fixed together.

In some embodiments, surface ventilation adds air channels on the A surface of a seat backrest and/or cushion. Air will be guided along these channels to the top of a seat cover. Using a piezoelectric fan 26 or piezoelectric fan unit 26 to be used in a ventilated seat may provide a relatively lightweight solution. Additionally, may have relatively low power consumption, compact size, and relatively low noise generation.

Typical seat ventilation systems may use air flow generated by a conventional fan that has to go through up to five layers of foam and trim covers. Such a system may be relatively heavy, noisy, and requires longer time to sensation for the occupant.

Functions of the piezoelectric fan or fan units 26 may be supported, including but not limited to venting, haptic vibration or notification, massage, and sound. Alternative technologies may be used in cooperation with or in place of piezoelectric fan or fan unit 26, such as electroactive polymers and electromagnetic speaker drivers. A speaker driver may be able to create vibration, airflow, and even audible sound to the occupant from the seat.

One or more aspects may include a number of applications, including surface ventilation in multiple positions and using different materials. One or more aspects may include cover carving technology and/or dual durometer pour molding to be used with disappearing film to protect inclusion of electronics and to create air ducts.

One aspect of the present disclosure includes a number of piezo or miniature fan units 26 mounted on the vehicle seat perforated foam at the backrest and/or seat bottom. Piezo fans or miniature fan units may be integrated in some of the cavities on the foam immediately below the trim cover in a direction toward the frame of the seat. The foam provides support and air space for full functionality of the piezo fan.

The cushion may include two different foams having two different densities. Foam may be bi-density foam, which may reduce over-lapping between the foams of different density during the manufacturing process. The plastic film then disappears and the two different density foams are coupled together.

A ventilated vehicle seat is provided using piezoelectric fans or fan units. By including cavities within single density or bi-density foam that is prepared using disappearing film, the package space of the piezoelectric fans or fan units is minimized while retaining full functionality of the fan or fan units. Air flow from the piezoelectric fans is maximized in locations across the foam and the fans may be mounted directly on the foam at the surface cavities or on the trim cover, or on both simultaneously. Installation locations may be based on seat thermal comfort needs, in which the fans may be controlled separately by personal ventilation preference in terms of air blowing speed or with a simple on/off switch.

A miniature fan may also be used to enable three different modalities, separately or in combination with one another. The modalities include but are not limited to piezoelectric, electroactive polymers (EAP's), and electromagnetic capabilities.

The invention claimed is:

1. An occupant support comprising
a cushion having an outer surface arranged to face an occupant of the occupant support, an inner surface spaced apart from the outer surface, and an intermediate surface located between the outer surface and the inner surface and the cushion formed to define a cooling passage that extends between the outer surface and the intermediate surface,
an air-permeable cushion cover arranged around the outer surface of the cushion, and
a ventilation unit located between the intermediate surface and the inner surface of the cushion, the ventilation unit including a flexible support panel and a piezoelectric fan coupled to the support panel, the piezoelectric fan aligned with the cooling passage and including a deformable membrane and a piezoelectric motor configured to undulate the deformable membrane in response to receiving electric energy so that the ventilation unit provides a flow of air through the cooling passage and air-permeable cushion cover to provide convective cooling to the occupant of the occupant support.

2. The occupant support of claim 1, wherein the flexible support panel is formed to include a panel aperture that extends through the flexible support panel and the piezoelectric fan closes the panel aperture.

3. The occupant support of claim 2, wherein the panel aperture is circular shaped and the deformable membrane included in the piezoelectric fan is circular shaped.

4. The occupant support of claim 2, wherein the cushion further includes a spacer surface located between the intermediate surface and the inner surface, the spacer surface is spaced apart from the intermediate surface to define a slot, and the ventilation unit is received in the slot.

5. The occupant support of claim 4, wherein the cushion is formed to define an intake passage that extends between the inner surface and the spacer surface and the piezoelectric fan is aligned with the intake passage.

6. The occupant support of claim 1, wherein the air-permeable cushion cover and cushion cooperate to define a plurality of ridges that extend toward the occupant and away from the inner surface, a pair of neighboring ridges cooperate to form a channel therebetween, and the cooling passage opens into the channel so that the flow of air is conducted into the channel during operation of the ventilation unit.

7. The occupant support of claim 6, wherein the channel extends along a channel axis, the cooling passage extends along a passage axis, the passage axis and the channel axis define an angle therebetween, and the angle is greater than zero degrees and less than ninety degrees.

8. The occupant support of claim 6, wherein the channel extends along a channel axis, the piezoelectric fan is oriented to conduct the flow of air along a passage axis, the passage axis and the channel axis define an angle therebetween, and the angle is greater than zero degrees and less than ninety degrees.

9. The occupant support of claim 1, wherein the ventilation unit further includes a controller configured to activate the piezoelectric fan in response to receiving an input.

10. The occupant support of claim 1, wherein the cushion and the flexible support panel are integrally formed.

11. An occupant support comprising
a cushion having an outer surface and an inner surface spaced apart from the outer surface,
an air-permeable cushion cover arranged around the outer surface of the cushion, and
a ventilation unit located between the air-permeable cushion cover and the cushion, the ventilation unit including a support panel and a piezoelectric fan coupled to the support panel,
wherein the piezoelectric fan includes a deformable membrane and a piezoelectric motor configured to undulate the deformable membrane in response to receiving electric energy.

12. The occupant support of claim 11, wherein the support panel is formed to include a panel aperture that extends through the support panel and the piezoelectric fan closes the panel aperture.

13. The occupant support of claim 12, wherein the panel aperture is circular shaped and the deformable membrane included in the piezoelectric fan is circular shaped.

14. The occupant support of claim 11, wherein the cushion includes an intermediate surface located between the outer surface and the inner surface and a spacer surface located between the intermediate surface and the inner surface to define a slot and the ventilation unit is received in the slot.

15. The occupant support of claim 14, wherein the cushion is formed to define a cooling passage that extends between the outer surface and the intermediate surface and an intake passage that extends between the inner surface and the spacer surface and the piezoelectric fan is aligned with the cooling passage and the intake passage.

16. The occupant support of claim 11, wherein the air-permeable cushion cover and cushion cooperate to define a plurality of ridges, a pair of neighboring ridges cooperate to form a channel therebetween, and at least a portion of the piezoelectric fan is located between the pair of neighboring ridges.

17. The occupant support of claim 16, wherein the channel extends along a channel axis, the piezoelectric fan is oriented to conduct air along a passage axis, the passage axis and the channel axis define an angle therebetween, and the angle is greater than zero degrees and less than ninety degrees.

18. The occupant support of claim 11, wherein the cushion and the support panel are integrally formed.

19. The occupant support of claim 11, wherein the ventilation unit further includes a controller configured to activate the piezoelectric fan in response to receiving an input.

* * * * *